COPELAND & MARTIN.

Rotary Churn.

No. 35,588.

Patented June 17, 1862.

Witnesses.

Inventors

UNITED STATES PATENT OFFICE.

JOHN COPELAND AND GEORGE P. MARTIN, OF QUASQUETON, IOWA.

IMPROVEMENT IN CHURNS.

Specification forming part of Letters Patent No. 35,588, dated June 17, 1862.

*To all whom it may concern:*

Be it known that we, JOHN COPELAND and GEORGE P. MARTIN, both of Quasqueton, in the county of Buchanan and State of Iowa, have invented a new and Improved Churn; and we do hereby declare that the following is a full, clear, and exact description of the same, reference being had to the accompanying drawings, forming part of this specification, in which—

Figure 2:
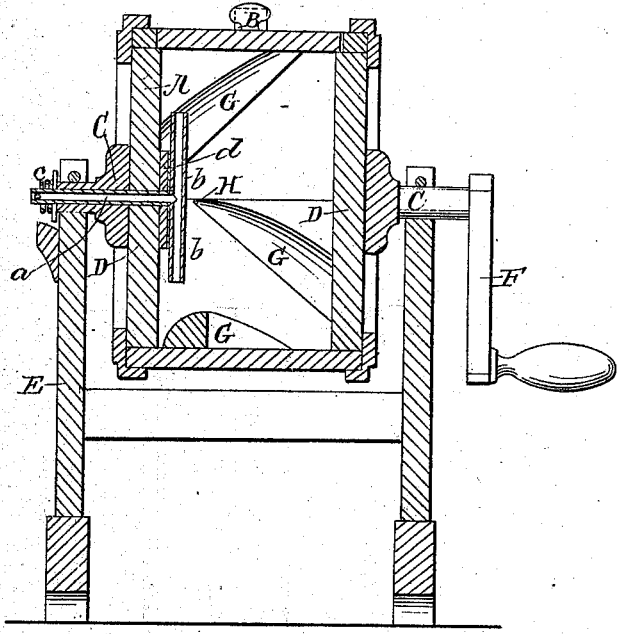
Figure 1:
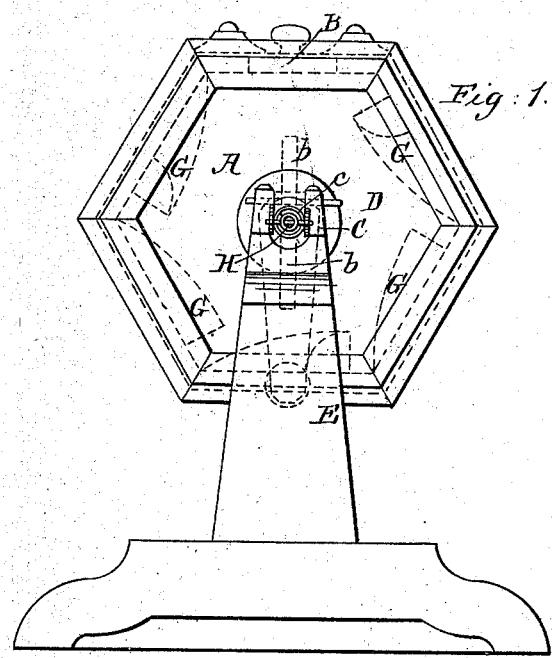

Figure 1 represents an end elevation of our invention. Fig. 2 is a longitudinal vertical section of the same.

Similar letters of reference in both views indicate corresponding parts.

This invention consists in the arrangement of inclined scoops on the inner surfaces of the sides of a rotary polygonal tub in such a manner that by the action of said scoops the cream is carried up and thrown alternately against the heads or ends of the tub, whereby butter is made in a short time, and with comparatively little labor.

It consists also in the arrangement of a T-shaped tube, the stem of which passes through one of the trunnions of the rotary tub, while its cross-tube is placed in a vertical direction in the interior of the tub and pressed up tight against the inner side of the head, and against a leather washer or other suitable packing placed between it and said head in such a manner that the escape of cream through the head and trunnion of the tub, or through the interior of the T-shaped tube, is prevented, and at the same time the external air has free access to the interior of the tub.

To enable those skilled in the art to make and use our invention, we will proceed to describe its construction and operation with reference to the drawings.

The box or tub A is made in the form of a six-sided or polygonal prisma, and one side is cut open and provided with a door, B. It rotates on trunnions C, which project from the centers of the heads D, and which have their bearings in a suitable frame, E. A crank, F, serves to impart to the tub the desired rotary motion.

To the inner surfaces of the sides of the tub A scoops G are secured in oblique directions and in such positions that they throw the cream alternately toward one head and then toward the other. By these means butter forms very rapidly and with comparatively little labor of the operator.

The air required for the formation of butter is admitted to the tub through a T-shaped tube, H, the stem $a$ of which passes through the center of one of the trunnions, while its two arms, $b$, are arranged in the interior of the tub in a vertical direction, as clearly shown in Fig. 2. A spring, $c$, which is secured to the stem $a$ of the tube H, pulls the arms $b$ close up against the inner surface of the head of the tub, and a packing-ring, $d$, which is placed between said arms and the head, prevents leakage through the trunnion.

By the position of the arms $b$ of the T-shaped tube H the escape of cream through said tube is prevented and the air has free access to the interior of the tub.

By the combined action of the T-shaped air-tube H and scoops G our churn is rendered very effective. The butter forms in a short time, and it separates perfectly from the cream, so that the remaining liquid can be drawn off without difficulty.

Having thus fully described our invention, what we claim as new, and desire to secure by Letters Patent, is—

1. The arrangement of oblique scoops G on the inner surfaces of the sides of a prismatical rotary tub, A, constructed and operating substantially as and for the purposes described.

2. The T-shaped air-tube H, passing through one of the trunnions C of the rotary tub A, in combination with the spring $c$ and packing-ring $d$, constructed and operating substantially as and for the purpose specified.

JOHN COPELAND.
G. P. MARTIN.

Witnesses:
HENRY M. STEVENS,
I. C. BASSETT.